(12) United States Patent
Terada et al.

(10) Patent No.: US 6,859,530 B1
(45) Date of Patent: Feb. 22, 2005

(54) COMMUNICATIONS APPARATUS, CONTROL METHOD THEREFOR AND STORAGE MEDIUM STORING PROGRAM FOR EXECUTING THE METHOD

(75) Inventors: Kosei Terada, Hamamatsu (JP); Takeshi Kikuchi, Hamamatsu (JP); Yutaka Hasegawa, Hamamatsu (JP); Takashi Kunii, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 651 days.

(21) Appl. No.: 09/723,967

(22) Filed: Nov. 27, 2000

(30) Foreign Application Priority Data

Nov. 29, 1999 (JP) .......................................... 11-337637

(51) Int. Cl.[7] .......................... H04M 1/00; H04M 3/00; H04M 1/38
(52) U.S. Cl. ................. 379/374.01; 455/415; 455/567; 84/604
(58) Field of Search ...................... 379/373.01, 373.02, 379/373.03, 373.04, 374.01, 386, 387.01; 455/415, 567; 84/604, 609, 610, 611, 612, 613, 614, 649, 650, 651

(56) References Cited

U.S. PATENT DOCUMENTS

| | | | |
|---|---|---|---|
| 4,688,464 A | | 8/1987 | Gibson et al. |
| 4,731,847 A | * | 3/1988 | Lybrook et al. ............ 704/260 |
| 4,856,055 A | * | 8/1989 | Schwartz ............... 379/373.02 |
| 5,153,829 A | * | 10/1992 | Furuya et al. ............... 84/622 |
| 5,208,852 A | * | 5/1993 | Tamura et al. ............... 379/353 |
| 5,736,663 A | * | 4/1998 | Aoki et al. .................... 84/609 |
| 5,850,048 A | | 12/1998 | Ruf ............................. 84/484 |
| 5,959,230 A | | 9/1999 | Fulford |
| 6,075,998 A | * | 6/2000 | Morishima .................. 455/567 |
| 6,084,168 A | * | 7/2000 | Sitrick ....................... 84/477 R |
| 6,166,314 A | * | 12/2000 | Weinstock et al. ......... 84/483.1 |
| 6,239,346 B1 | * | 5/2001 | Goto et al. ................... 84/604 |
| 6,308,086 B1 | * | 10/2001 | Yoshino ..................... 455/567 |
| 6,343,055 B1 | * | 1/2002 | Ema et al. ............... 369/53.16 |
| 6,411,198 B1 | * | 6/2002 | Hirai et al. .................. 340/7.6 |
| 6,472,591 B2 | * | 10/2002 | Aoki et al. .................. 84/611 |
| 6,636,602 B1 | * | 10/2003 | Vlacancich ............ 379/374.01 |
| 6,639,142 B2 | * | 10/2003 | Takahashi ..................... 84/609 |

FOREIGN PATENT DOCUMENTS

| | | |
|---|---|---|
| DE | 25 52 802 | 6/1977 |
| EP | 0 795 845 | 9/1997 |
| EP | 0 851 649 | 12/1997 |
| EP | 0 933 917 | 8/1999 |
| FR | 69.24698 | 9/1971 |
| GB | 432873 | 11/1937 |
| GB | 1 280 117 | 7/1972 |
| WO | WO 98/41000 | 9/1998 |

OTHER PUBLICATIONS

K. Jarvinen, et al., :GSM Enhanced Full Rate Speech Codec, IEEE, 1997, pp. 771–774.

* cited by examiner

*Primary Examiner*—Binh Tieu
(74) *Attorney, Agent, or Firm*—Morrison & Foerster LLP

(57) ABSTRACT

A communication apparatus having value added functions useful for musicians is provided. A tempo signal having a cycle corresponding to a tempo set by a user through an operation device is generated, a musical tone signal equivalent to a metronome sound is generated in accordance with the generated tempo signal, and the metronome sound is generated in accordance with the generated musical tone signal. Therefore, the present invention can contribute to further increasing the added value of a communication apparatus, which is requisite for musicians.

18 Claims, 7 Drawing Sheets

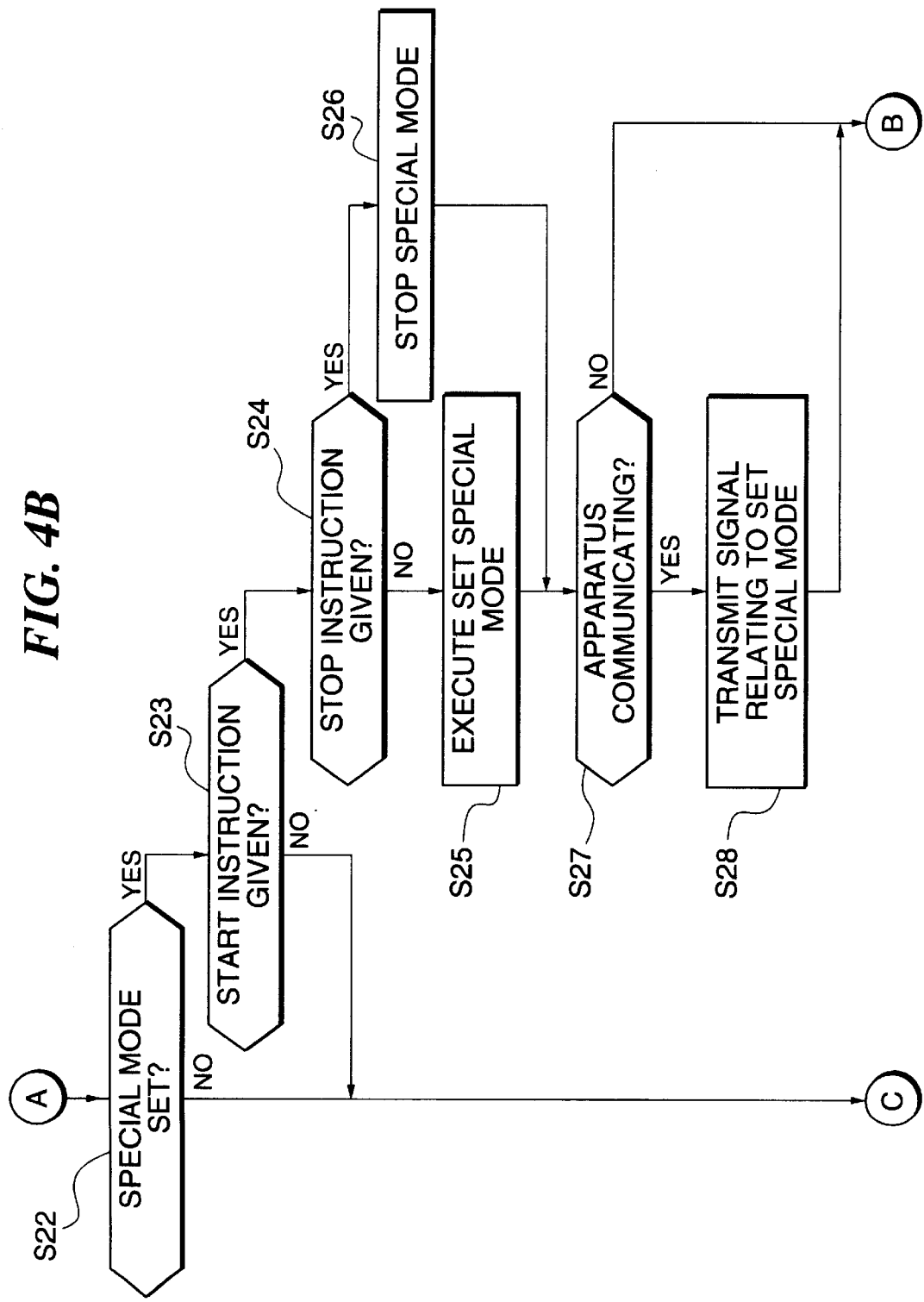

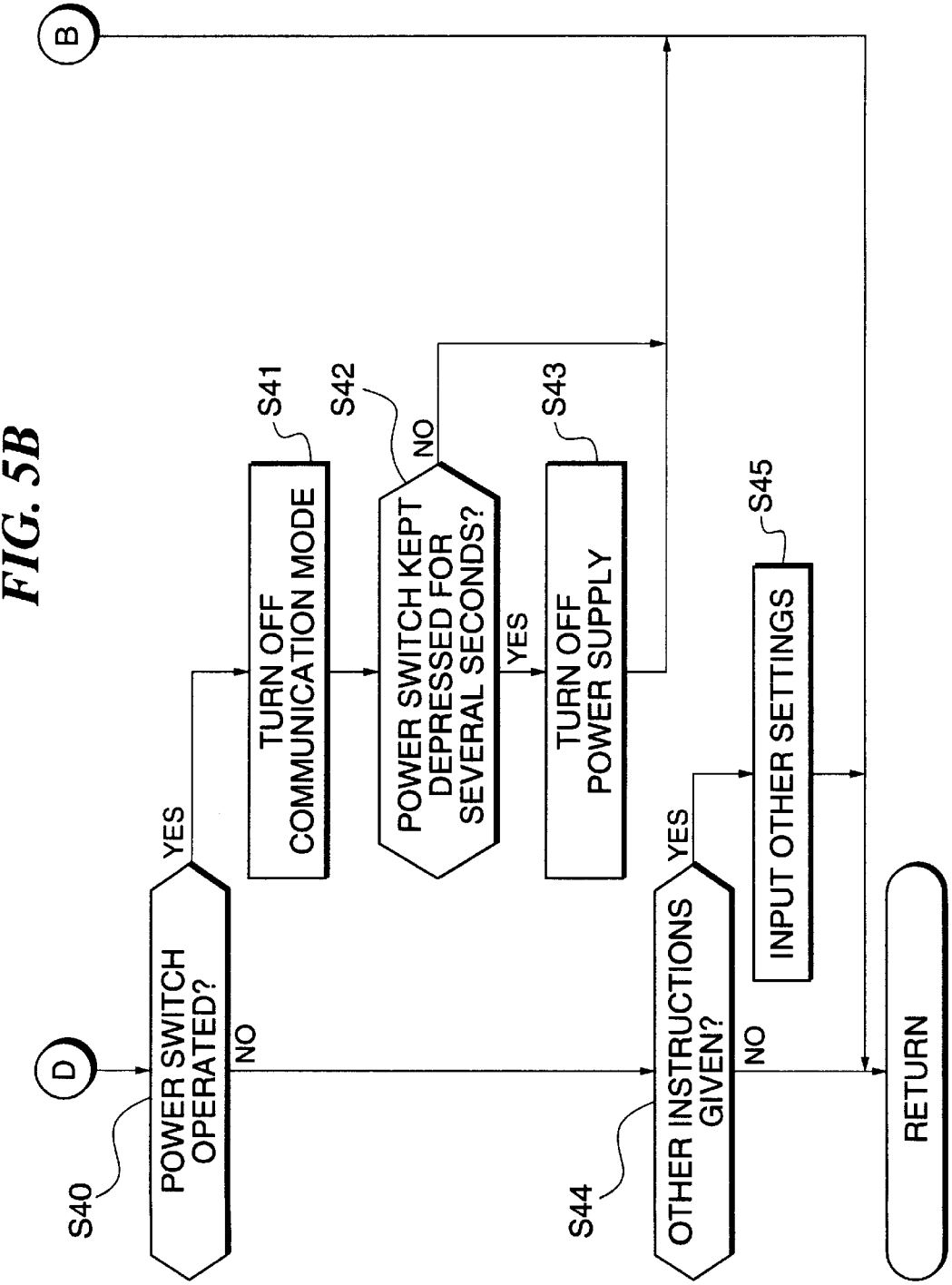

COMMUNICATIONS APPARATUS, CONTROL METHOD THEREFOR AND STORAGE MEDIUM STORING PROGRAM FOR EXECUTING THE METHOD

BACKGROUND OF THE INVENTION

1. Field of the Invention

The present invention relates to a communication apparatus having value added functions in addition to communication functions, a control method therefor, and a storage medium storing a program for executing the same control method.

2. Prior Art

Communication apparatuses, e.g. cellular phones have, in addition to communication functions, such value added functions as (1) a game-playing function, (2) a schedule function, (3) an e-mail function, (4) an Internet connecting function, (5) a clock function, and (6) a ring-tone song composing and automatic playing function.

As to the ring-tone song composing aspect of the function (6), conventional cellular phones employ a method in which a user, after selecting a composition mode, designates in time sequence the pitch and duration of musical tones of a ring-tone song which he or she intends to compose, by depressing buttons provided on an operation panel of the cellular phone. In addition to the above method of composing a ring-tone song, these conventional cellular phones allow the user to access a server of, for example, a telephone company to download ready-made ring-tone songs.

As to the ring-tone song automatic playing aspect of the function (6), it is designed such that the ring-tone song, whether user-composed or ready-made, starts to be played whenever the user likes or receives a call.

However, the above-mentioned conventional communication apparatuses have their value added functions designed for ordinary users, giving no considerations to special users such as musicians, and hence they lack value added functions specially needed by musicians.

SUMMARY OF THE INVENTION

It is an object of the present invention to provide a communication apparatus having value added functions useful for musicians, a control method therefor, and a storage medium storing a program for executing the same control method, whereby the added value of the communication apparatus can be further increased.

To attain the above object, according to a first aspect of the present invention, a tempo signal having a cycle corresponding to a tempo set by a user through an operation device is generated, a musical tone signal equivalent to a metronome sound is generated in accordance with the generated tempo signal, and the metronome sound is generated in accordance with the generated musical tone signal. Therefore, the first aspect of the invention can contribute to further increasing the added value of a communication apparatus, which is requisite for musicians.

The communication apparatus herein used is preferably a portable radio communication apparatus typically represented by a cellular phone, but is not limited to this. A portable wire communication apparatus, or a communication apparatus that is not portable may also be used. The metronome sound can be selected from a variety of tone colors, depending on how the musical tone signal generating device is designed. Even the musical tone signal generating device with the simplest construction must be able to generate at least an incoming tone (a signal tone of DTMF (dual tone multiplexed frequency)) and thus, the metronome sound may be generated in a tone color of such an incoming tone. The metronome sound may, of course, be generated in other ways as well. Further, the tempo of the metronome sound may be displayed on an LCD along with the generation of the metronome sound.

Preferably, an informing mode is selected in accordance with the generated tempo signal, and an information device is controlled to inform the user of the selected tempo in the selected informing mode.

The information device herein used is constructed of, for example, LEDs or an LCD, and the information modes offered by this device may be switched, when it is constructed of the LEDs, by changing their blinking interval and/or emitting color, for example, and, when it is constructed of the LCD, by changing the blinking interval and/or emitting color of its backlight, for example.

Further, according to a second aspect of the present invention, at least one of the generated tempo signal and a control signal indicative of start timing of generation of the tempo signal is transmitted to other communication apparatuses with which the communication apparatus is communicating. As a result, a plurality of users can play music in synchronism at remote locations.

Still further, according to a third aspect of the present invention, a playing sound produced by a musical instrument is input through a speech input device, the frequency of the input playing sound produced by the musical instrument is analyzed, and information relating to pitch of the playing sound is informed to the user through the information device in accordance with the analyzed frequency. Therefore, the third aspect of the invention can contribute to further increasing the added value of the communication apparatus, which is requisite for musicians, and helps even beginners to tune their musical instruments accurately.

The information device herein used is constructed of, for example, a display or a speech synthesizer, and if the display is used, for example, the frequency, pitch or pitch name of the playing sound may be displayed as the information relating to the pitch of the playing sound, and if the speech synthesizer is used, a speech synthesis of, for example, the frequency, pitch or pitch name of the playing sound may be carried out to generate the synthesized speech as the same information.

Still further, according to a fourth aspect of the present invention, a musical tone signal having a pitch set by the user through the operation device is generated to generate a musical tone having the set pitch. Therefore, advantageous results similar to those provided by the third aspect can be obtained.

The operation device herein used includes at least a numeric keypad (provided with alphabetic letters as well). To set a pitch, the user may enter, for example, the frequency, degree name, or pitch name through this numeric keypad. The set pitch may be displayed on the LCD along with generation of the musical tone.

According to a fifth aspect of the present invention, information indicative of the pitch set by the user through the operation device is transmitted to other communication apparatuses with which the communication apparatus is communicating. As a result, musical instruments can be tuned simultaneously at remote locations.

The above and other objects of the invention will become more apparent from the following drawings taken in conjunction with the accompanying drawings.

DETAILED DESCRIPTION OF PREFERRED EMBODIMENT

The present invention will now be described in detail with reference to drawings showing a preferred embodiment thereof.

Figure 1:
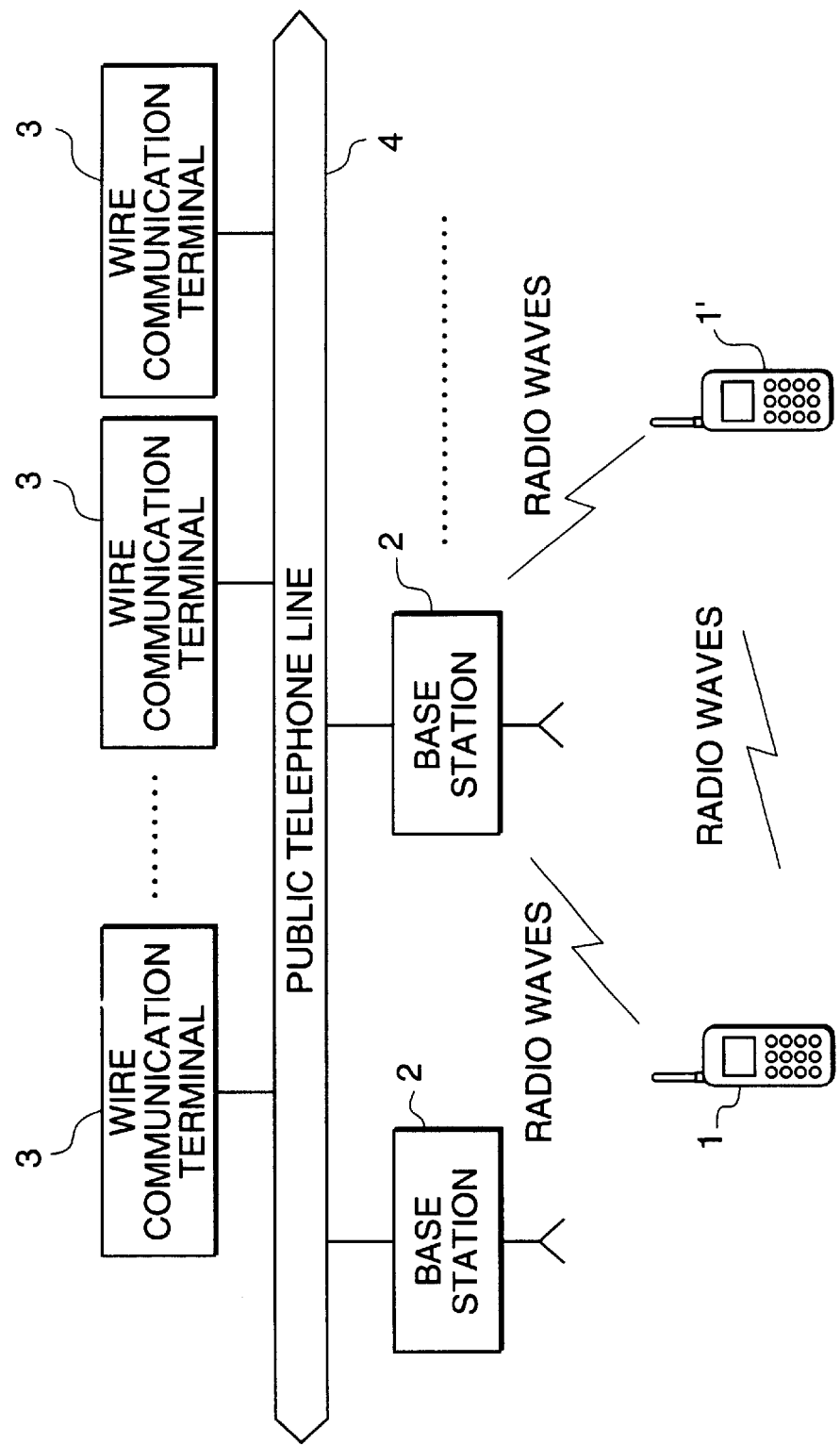
FIG. 1 is a schematic block diagram showing an example of a system configuration required when a communication apparatus according to an embodiment of the present invention communicates with other communication apparatuses.

FIG. 1 is a schematic diagram showing an example of a system configuration required when a communication apparatus according to an embodiment of the present invention communicates with other communication apparatuses. In the example shown in the figure, a cellular phone is used as the communication apparatus 1 according to the present embodiment, and a cellular phone 1' having a similar construction to that of the communication apparatus 1 and a plurality of wire communication machines 3 are used as other communication apparatuses.

A plurality of base stations 2 and the plurality of wire communication machines 3 are connected to one another through a non-leased, public line (telephone line), so that communications can be carried out between the communication apparatus 1 and the cellular phone 1' and between the communication apparatus 1 (or the cellular phone 1') and the wire communication machines 3.

The communication apparatus 1 radiocommunicates directly with the cellular phone 1' when the phone 1' is located near the communication apparatus 1, and indirectly through a base station 2 when the phone 1' is at a remote distance beyond radio waves.

Although the cellular phone is used as the communication apparatus 1 in the present embodiment, this is merely for reasons of convenience. Alternatively, the communication apparatus 1 may be a portable wireless (or wired) terminal, a typical example of which is a mobile computer, or it may be the above-mentioned wire communication machine 3.

Figure 2:
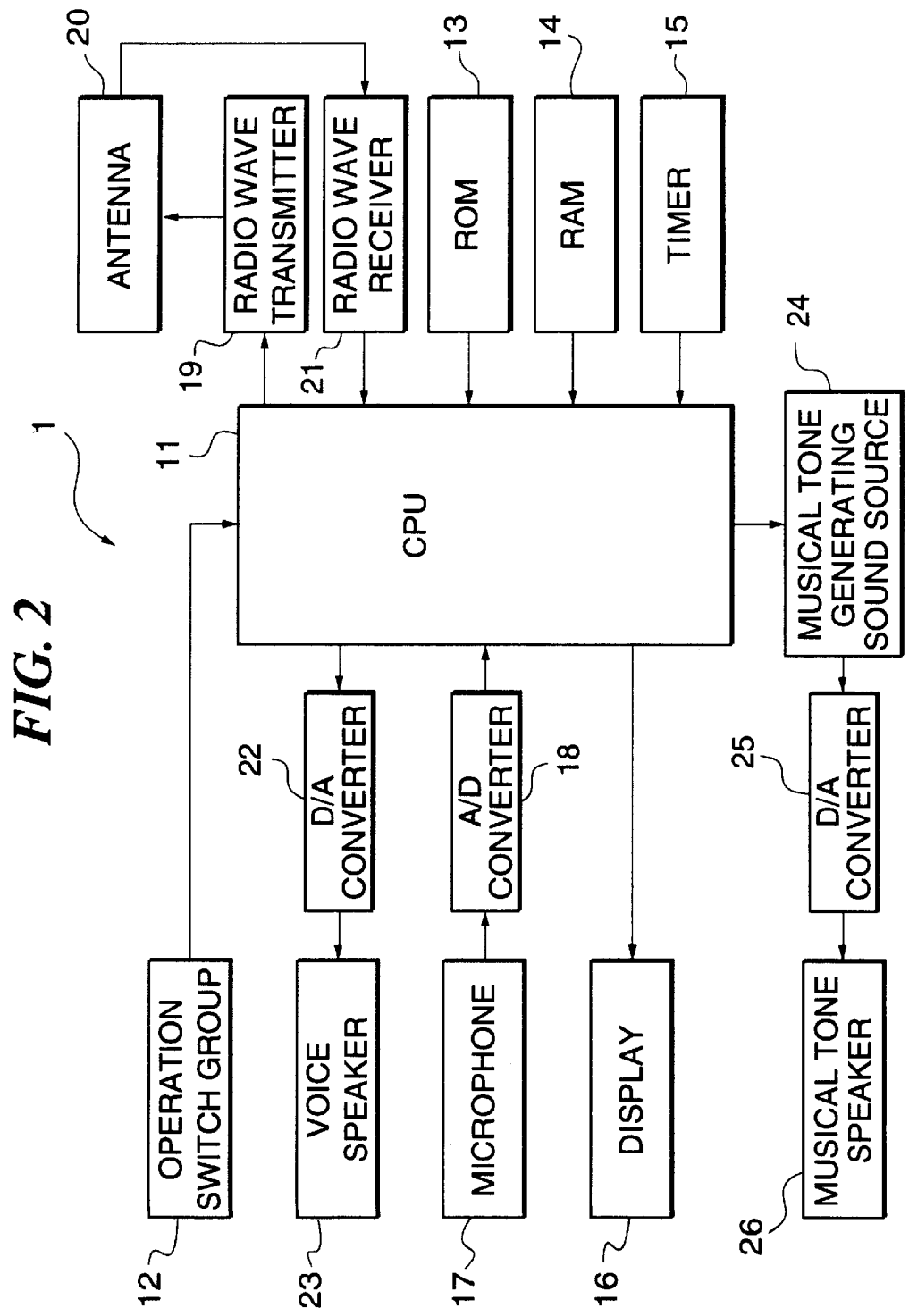
FIG. 2 is a schematic block diagram showing the construction of the communication apparatus appearing in FIG. 1.

FIG. 2 is a schematic block diagram showing the construction of the communication apparatus 1 according to this embodiment.

In the figure, reference numeral 11 designates a CPU that controls the entire apparatus, to which are connected an operation switch group 12 comprised of a numeric keypad and various function switches, a ROM 13 that stores control programs executed by the CPU 11, various table data and other data, a RAM 14 that temporarily stores performance data (including ring-tone song data), various input information (e.g. address book information, speech information recorded by a telephone message recording function or the like), computation results, and others, a timer 15 that measures interrupt time for a timer interrupt process, various kinds of time (including tempo, described hereinafter) and clock time, and a display 16 equipped with, e.g. a liquid crystal display (LCD), light-emitting diodes (LEDs) or the like, for displaying various kinds of information.

Also connected to the CPU 11 are a microphone 17 that inputs speech signals through an A/D converter 18 that converts analog signal outputs from the microphone 17 into digital signals, a radio wave transmitter 19 that converts the thus input speech signals and various control signals into radio waves and transmits the radio waves to the cellular phone 1' and the base stations 2 through an antenna 20, and a radio wave receiver 21 that receives radio waves received through the antenna 20 and converts the received radio waves into speech signals and various control signals.

Further connected to the CPU 11 are a voice speaker 23 that converts conversations of a partner, i.e. speech signals transmitted from the cellular phone 1' or wire communication machine 3 of the partner into speech sounds through a D/A converter 22 that converts digital speech signals from the CPU 11 into analog speech signals, and a musical tone generating sound source 24 that generates various digital musical tone signals whose tone colors are varied through control of the CPU 11. Connected to the musical tone generating sound source 24 at its output terminal is a D/A converter 25 that converts digital musical tone signals from the sound source 24 into analog musical tone signals, and connected to the D/A converter 25 at its output terminal is a musical tone speaker 26 that converts the analog musical tone signals into acoustic sounds.

Control processes executed by the communication apparatus 1 constructed as above will be described first in outline and then in detail with reference to FIGS. 3 to 5.

The communication apparatus 1 has two roughly divided modes, i.e. an ordinary mode and a special mode. The ordinary mode is a mode which is selected to execute all functions usually provided in the conventional cellular phones, while the special mode is a mode which is selected to execute functions unique to the present invention. Specifically, the special mode includes the following three functions:

(1) A metronome function that implements the same operations as those performed by ordinary metronomes, i.e. ticking away tempo designated by a user and informing the user of the tempo;

(2) A tuning function that determines whether or not a musical instrument is properly tuned by inputting a playing sound produced by the musical instrument through the microphone 17 and analyzing the frequency of the playing sound; and (3) A designated pitch outputting function that generates a musical tone having a pitch designated by the user.

When the user selects the special mode and then one of the above three functions, the selected function is performed. Since all these three functions are needed by musicians, addition of these functions to the communication apparatus contributes to further increasing the added value of the communication apparatus. Further, a portable communication apparatus is essential for musicians nowadays and thus it seems that they would carry such an apparatus with them at all times. Therefore, implementation of the functions needed by the musicians with such a communication apparatus would benefit the musicians to such an extent that they will no longer need to carry another apparatus dedicated to the same functions.

Further, the metronome function (1) mentioned above includes a transmission function of transmitting a tempo signal itself that ticks or marks a designated tempo, or various information including a designated tempo value and tempo signal generation start timing as a control signal from the communication apparatus 1 to other communication apparatuses, such as the cellular phone 1', whose construction is similar to that of the apparatus 1, while the communication apparatus 1 is communicating with such other communication apparatuses. This function thus enables a plurality of users who are away from one another to perform music synchronously.

Similarly, the designated pitch outputting function (3) mentioned above includes a function of transmitting a control signal for generating a musical tone whose pitch is designated through the communication apparatus 1 from the communication apparatus 1 to other communication apparatuses with which the apparatus 1 is communicating. This function enables a plurality of users to tune their musical instruments simultaneously at distant locations.

Control processes for implementing these functions will now be described in detail.

Figure 3:
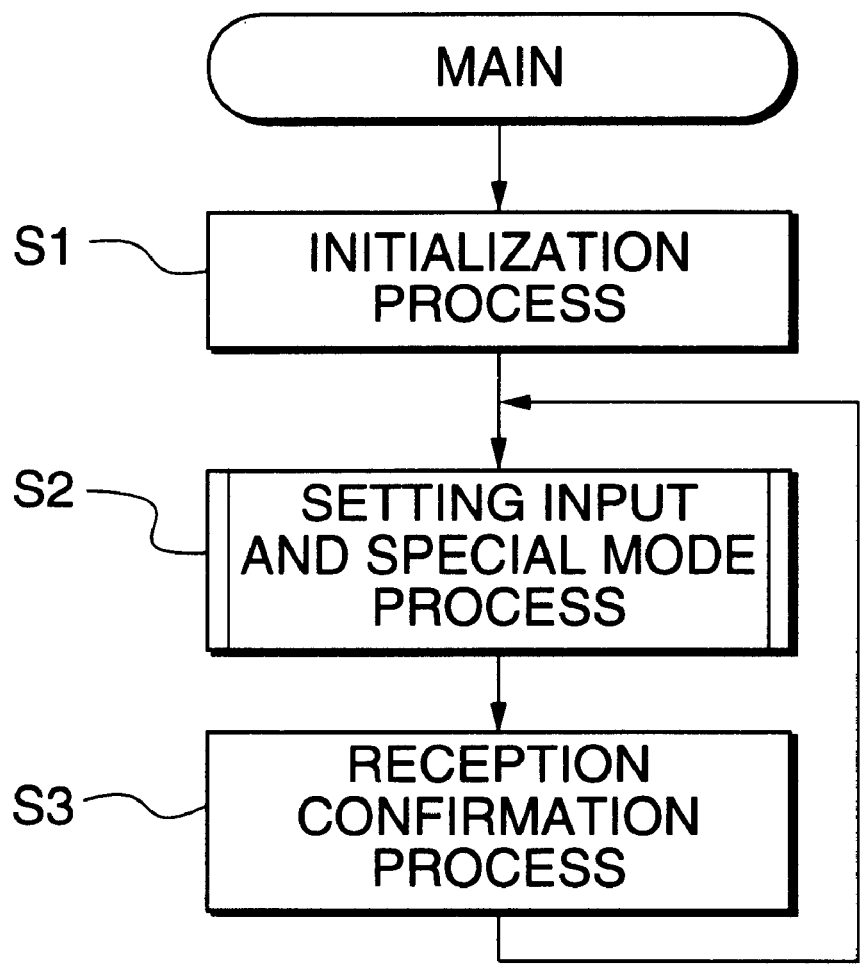
FIG. 3 is a flowchart showing the procedure of a main routine executed by the communication apparatus, particularly by a CPU, appearing in FIG. 2.

FIG. 3 is a flowchart showing the procedure of a main routine executed by the communication apparatus 1 according to this embodiment, particularly by the CPU 11. This main routine is activated upon supply of power to the entire apparatus from a battery, not shown, when a user keeps depressing a power switch, not shown, of the operation switch group 12 for several seconds, for example.

In the figure, first, an initialization process is executed to clear the RAM 14, various ports and others (step S1).

Next, the CPU 11 executes a setting input and special mode process subroutine (described hereinafter in detail with reference to FIGS. 4 and 5) to monitor setting inputs made through the operation switch group 12 and execute, upon detection of such setting inputs, operations corresponding to the detected setting inputs (step S2).

The CPU 11 monitors the incoming of a communication signal (the incoming of a telephone call) and executes a reception confirmation process to generate an incoming tone (ring tone) (step S3), after which the process returns to the step S2 to repeat the above-mentioned processes.

Figure 4A:
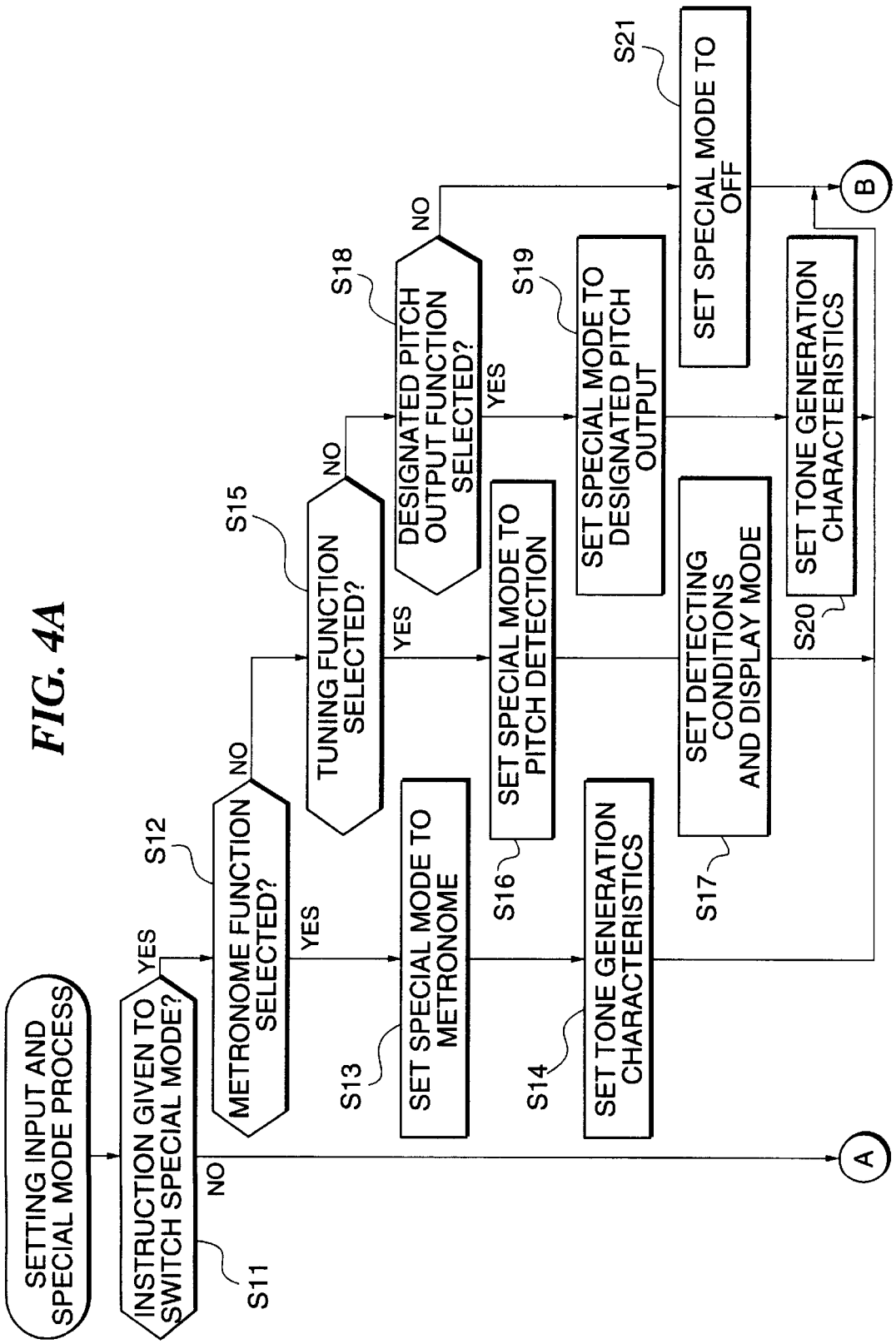
FIG. 4 is a flowchart showing in detail the procedure of a setting input and special mode process subroutine appearing in FIG. 3.
Figure 5A:
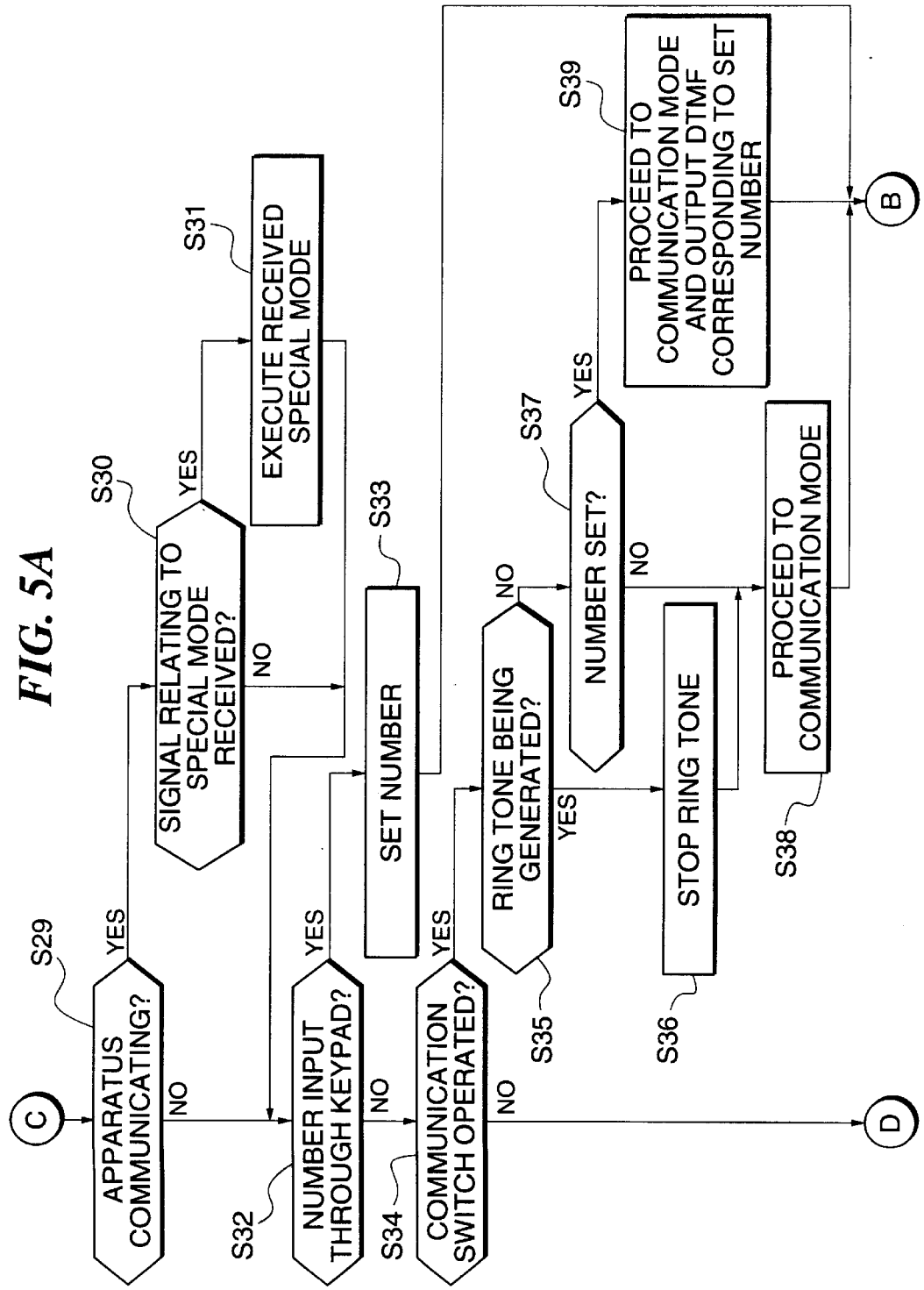
FIG. 5 is a flowchart showing a continuation of the setting input and special mode process subroutine of FIG. 4.

FIGS. 4 and 5 are a flowchart showing in detail the procedure of the setting input and special mode process subroutine.

In FIG. 4, first, it is determined whether or not an instruction has been given to switch the functions in the special mode (step S11), and if such an instruction has been given, the process branches in accordance with a function designated by the instruction.

If the metronome function is selected, the special mode is set to "METRONOME" so as to indicate that the metronome function is selected as the special mode (steps S12→S13), and then tone generation characteristics, i.e. speed (tempo) and tone color (the tone color of the metronome sound) are set according to a designation made by the user (step S14).

If the tuning function is selected, the special mode is set to "PITCH DETECTION" so as to indicate that the tuning function is selected as the special mode (steps S12→S15→S16), followed by setting or designating not only detecting conditions required for pitch detection (e.g. tone color, musical interval in terms of steps, and sensitivity) but also a display mode, i.e. how the detected pitch is displayed (for example, in terms of frequency, pitch, or pitch name) (step S17).

If the designated pitch outputting function is selected, the special mode is set to "DESIGNATED PITCH OUTPUT" so as to indicate that the designated pitch outputting function is selected as the special mode (steps S12→S15→S18→S19), followed by designating tone generation characteristics therefor, i.e. tone color, pitch, tone generating time period and others (step S20).

If it is instructed to turn off the special mode, i.e. a change from the special mode to the ordinary mode is designated, the special mode is set to "OFF" (steps S12→S15→S18→S21)

On the other hand, if no instruction is given to switch the special mode functions at the step S11, it is determined whether or not the special mode is set as the current mode (step S22). If the answer is YES, the process branches in accordance with whether or not an instruction has been given to start the special mode. That is, if such an instruction has been given, the process proceeds to a step S24, or otherwise jumps to a step S29 of FIG. 5.

At the step S24, whether or not an instruction has been given to stop the special mode is determined. If the answer is NO, the selected special mode function is executed (step S25), and if the answer is YES, the special mode is stopped (step S26).

At the following step S27, it is determined whether or not the communication apparatus 1 is communicating with another communication apparatus, and if it is, a control signal relating to the selected special mode function is transmitted to the other communication apparatus (step S28), or otherwise the setting input and special mode process is immediately terminated. It may be designed such that the start and stop of the special mode can be designated by operating, e.g. a communication switch, not shown, which is among the switches of the operation switch group 12. It goes without saying that such a designation may be made by other means, instead.

Specifically, the special mode is executed in the following manners.

(1) The metronome function: An instruction is given to the musical tone generating sound source 24 to generate a musical tone signal corresponding to the designated tone color every time the timer 15 counts a cycle corresponding to the set tempo. As a result, the musical tone speaker 26 generates a metronome sound. Note that the metronome function may be realized not only by means of the metronome sound as with this case, but also by means of the LEDs or the LCD provided on the display 16, for example. Specifically, if the LEDs are used, the blinking interval and/or emitting color of the LEDs may be changed in accordance with the designated tempo, for example. If the LCD is used, the blinking interval and/or emitting color of its backlight may be changed in accordance with the designated tempo, for example. Further, it may be arranged such that the tempo of the metronome sound is displayed on the LCD along with generation of the metronome sound.

(2) The tuning function: The frequency of a playing sound produced by a musical instrument which has been input via the microphone 17 is analyzed based on the set detecting conditions, and the result of the analysis is displayed on the display 16 in the designated display mode. For example, if "DISPLAY IN FREQUENCY" is set as the display mode, the frequency obtained from the analysis is directly displayed, and if "DISPLAY IN PITCH" is set, the pitch is displayed as converted (e.g. in terms of degrees) from the analyzed frequency. Further, if "DISPLAY IN PITCH NAME" is set, the pitch name is displayed as converted from the analyzed frequency. If the communication apparatus 1 has a speech synthesizing circuit incorporated therein, the user may be informed of the analysis result in the form of a speech generated by this speech synthesizing circuit. In this case, it may be arranged such that the user can select an information mode from "INFORM IN FREQUENCY," "INFORM IN PITCH," and "INFORM IN PITCH NAME," similarly to the display mode options so as to be informed of the analysis result in the selected information mode.

(3) The designated pitch outputting function: An instruction is given to the musical tone generating sound source 24 to generate a musical tone signal having the designated tone color and pitch for the designated tone generating time period, whereby the musical tone speaker 26 generates a musical tone having the designated pitch. Upon generation of the musical tone, the LCD may display the pitch of the musical tone.

At the step S29 in FIG. 5 as well, whether or not the communication apparatus 1 is communicating with another communication apparatus is determined, similarly to the step S27, and if the answer is YES, it is further determined whether or not a control signal relating to the special mode has been received (step S30). If the control signal has been received, a special mode function instructed by the received control signal is executed (step S31). If, on the other hand, the communication apparatus 1 is not communicating, or if the control signal relating to the special mode has not been received, the process proceeds to a step S32.

At the step S32, it is determined whether or not a number has been input through the numeric keypad, and if the answer is YES, the input number is set (step S33). This process of setting the input number means specifically both a process of outputting a DTMF signal tone corresponding to the input number and a process of displaying the input number on the display 16 and temporarily storing the same in a predetermined area reserved in the RAM 14.

If it is determined at the step S32 that no input has been made through the numeric keypad, it is further determined whether or not the communication switch has been operated (step S34), and if the switch has been operated, whether or not a ring tone is being generated is determined (step S35).

If the ring tone is being generated at the step S35, the ring tone is stopped (step S36), after which the process proceeds to a step S38 to switch the special mode to the communication mode, whereas if the ring tone is not being generated, whether or not the input number has been set is determined (step S37).

If the input number has not been set at the step S37, the process proceeds to a step S38 to switch the special mode to the communication mode, whereas if the input number has been set, the special mode is switched to the communication mode and then a DTMF signal tone corresponding to the set number is output (step S39).

On the other hand, if the communication switch has not been operated at the step S34, then, whether or not the power switch has been operated is determined (step S40), and if the switch has been operated, the communication mode is turned off (step S41). If the power switch has further continuously been depressed for a longer time period (several seconds, for example), the power supply is turned off (steps S42→S43), followed by terminating the setting input and special mode process.

On the other hand, if the power switch has not been operated at the step S40, it is determined whether or not other instructions relating to functions such as, for example, the ring-tone song function, communication volume adjusting function, and telephone message recording function have been given (step S44). If no other instruction has been given, the setting input and special mode process subroutine is terminated, and if any such other instruction has been given, a setting operation corresponding to the given instruction is executed (step S45), and then the setting input and special mode process is terminated.

As described above, according to the present embodiment, a communication apparatus having value-added functions requisite for musicians is implemented by a cellular phone. Therefore, the communication apparatus cannot only exhibit excellent portability but also perform useful functions instantly right on the spot. Further, the value-added functions provided by the present embodiment can be realized by utilizing the hardware of which any ordinary communication apparatus is constructed, and thus the manufacturing cost can be curtailed and the whole size of the apparatus can be kept small. Still further, the value-added functions provided by the present embodiment are intended to be used singly, i.e. not used in combination, and hence the user can use these value-added functions by switching them from one function to another appropriately; that is, the communication apparatus according to the present embodiment can be a perfect substitute for an apparatus dedicated to the same functions.

It goes without saying that the object of the present invention can be achieved by supplying a system or apparatus with a storage medium having stored therein program codes of software for implementing the functions of the above described embodiment, and causing a computer (or the CPU 11 or an MPU) of such a system or apparatus to read and execute the program codes stored in the storage medium.

In this case, it is the program codes read from the storage medium that implement the novel functions of the present invention, and hence the storage medium having the program codes stored therein constitutes the present invention.

The storage medium for providing the program code is, for example, the ROM 6, a floppy disk, a hard disk, an optical disk, a magneto optic disk, a CD-ROM, a CD-R, a magnetic tape, or a non-volatile memory card.

What is claimed is:

1. A communication apparatus comprising:

a musical tone signal generating device that generates musical tone signals;

an operation device that allows a user to perform setting operations;

a communication device that communicates with other communication apparatuses in accordance with said setting operations performed through said operation device;

a tone generating device that converts speech signals transmitted from said other communication apparatuses into speech and generates the speech, and converts said musical tone signals generated by said musical tone generating device into musical tones and generates the musical tones;

a tempo signal generating device that generates a tempo signal having a cycle corresponding to a tempo set by the user through said operation device;

a tone generation control device that controls said musical tone signal generating device to generate a musical tone signal equivalent to a metronome sound in accordance with said tempo signal generated by said tempo signal generating device, whereby said metronome sound is generated through said tone generating device, and a tempo signal transmitting device that transmits at least one of said tempo signal generated by said tempo signal generating device and a control signal indicative of start timing of generation of said tempo signal to said other communication apparatus, through said communication device.

2. A communication apparatus according to claim 1, wherein said tempo signal transmitting device transmits at least one of said tempo signal and said control signal to said other communication apparatuses during communication of said communication apparatus with said other communication apparatus.

3. A communication apparatus according to claim 1, further comprising an information device that informs the user of calling of said communication apparatus to said other communication apparatuses when said communication apparatus is calling said other communication apparatuses for communication with said other communication apparatuses, and an information mode control device that selects an informing mode in accordance with said tempo signal generated by said tempo signal generating device and controls said information device to inform the user of said tempo in the selected informing mode.

4. A communication apparatus according to claim 3, wherein said tempo signal transmitting device transmits at least one of said tempo signal generated and said control signal to said other communication apparatuses during communication of said communication apparatus with said other communication apparatuses.

5. A communication apparatus comprising:
a speech input device that inputs speech;
a musical tone signal generating device that generates musical tone signals;
an operation device that allows a user to perform setting operations;
a communication device that communicates with other communication apparatuses in accordance with said setting operations performed through said operation device;
a tone generating device that converts speech signals transmitted from said other communication apparatuses into speech and generates the speech, and converts said musical tone signals generated by said musical tone generating device into musical tones and generates the musical tones;
an analyzing device that inputs a playing sound produced by a musical instrument through said speech input device and analyze a frequency of the input playing sound produced by said musical instrument;
a selecting device that allows the user to select a desired display mode from a plurality of display modes in which information relating to a pitch of said playing sound is displayed in different manners; and
a display device that displays said information relating to the pitch of said playing sound based on the analyzed frequency according to said desired display mode selected by the user through said selecting device.

6. A communication apparatus according to claim 5, wherein said plurality of display modes include at least one display mode selected from the group consisting of a display mode in which the information is displayed as frequency, a display mode in which the information is displayed as pitch, and a display mode in which the information is displayed as pitch name.

7. A communication apparatus capable of communicating with other communication apparatuses, comprising:
an operation device that instructs generation of musical tones in accordance with operations performed by a user, said musical tones each having a pitch designated by the user;

a musical tone signal generating device that generates musical tone signals;
a tone generating device that converts said musical tone signals generated by said musical tone generating device into musical tones and generates the musical tones; and
a tone generation control device that controls said musical tone signal generating device to generate a musical tone signal equivalent to said pitch designated by the user through said operation device, whereby a musical tone having said pitch is generated through said tone generating device, during communication of said communication apparatus with said other communication apparatuses.

8. A communication apparatus according to claim 7, further comprising a pitch information transmitting device that transmits information indicative of said pitch designated by the user to said other communication apparatuses during communication of said communication apparatus with said other communication apparatuses.

9. A method of controlling a communication apparatus, comprising the steps of:
(a) generating musical tone signals;
(b) causing said communication apparatus to communicate with other communication apparatuses in accordance with setting operations performed through an operation device that allows a user to perform said setting operations;
(c) converting speech signals transmitted from said other communication apparatuses into speech to generate the speech, and converting said musical tone signals generated by said step (a) into musical tones to generate the musical tones;
(d) generating a tempo signal having a cycle corresponding to a tempo set by the user through said operation device;
(e) controlling said communication apparatus such that a musical tone signal equivalent to a metronome sound is generated by said step (a) in accordance with said tempo signal generated by said step (d), whereby said metronome sound is generated by said step (c); and
(f) transmitting at least one of said tempo signal generated by said step (d) and a control signal indicative of start timing of generation of said tempo signal to said other communication apparatuses.

10. A method of controlling a communication apparatus, comprising the steps of:
(a) inputting speech through a speech input device;
(b) generating musical tone signals;
(c) causing said communication apparatus to communicate with other communication apparatuses in accordance with setting operations performed through an operation device that allows a user to perform said setting operations;
(d) converting speech signals transmitted from said other communication apparatuses into speech to generate the speech, and converting said musical tone signals generated by said step (b) into musical tones to generate the musical tones;
(e) inputting a playing sound produced by a musical instrument through said speech input device and analyzing a frequency of the input playing sound produced by said musical instrument; and
(f) displaying information relating to a pitch of said playing sound based on the analyzed frequency, according to a desired display mode selected by the user through a selecting device that allows the user to select said desired display mode from a plurality of display modes in which said information relating to the pitch of said playing sound is displayed in different manners.

11. A method of controlling a communication apparatus capable of communicating with other communication apparatuses, comprising the steps of:

(a) generating musical tone signals;

(b) converting said musical tone signals generated by said step (a) into musical tones and generating the musical tones; and (c) controlling said communication apparatus such that a musical tone signal having a pitch designated by a user through an operation device that instructs generation of said musical tones in accordance with operations performed by the user is generated by said step (a), whereby a musical tone having said pitch is generated by said step (b), during communication of said communication apparatus with said other communication apparatuses.

12. A machine-readable storage medium recording instructions for causing a machine to execute a method of controlling a communication apparatus, said method comprising the steps of:

(a) generating musical tone signals;

(b) causing said communication apparatus to communicate with other communication apparatuses in accordance with setting operations performed through an operation device that allows a user to perform said setting operations;

(c) converting speech signals transmitted from said other communication apparatuses into speech to generate the speech, and converting said musical tone signals generated by said step (a) into musical tones to generate the musical tones;

(d) generating a tempo signal having a cycle corresponding to a tempo set by the user through said operation device;

(e) controlling said communication apparatus such that a musical tone signal equivalent to a metronome sound is generated by said step (a) in accordance with said tempo signal generated by said step (d), whereby said metronome sound is generated by said step (c); and (f) transmitting at least one of said tempo signal generated by said step (d) and a control signal indicative of start timing of generating of said tempo signal to said other communication apparatuses.

13. A storage medium according to claim 12, wherein during said step (f), at least one of said tempo signal and said control signal is transmitted to said other communication apparatuses.

14. A storage medium according to claim 12, wherein said method further comprises the steps of:

(f) informing the user, through an information device, of calling of said communication apparatus to said other communication apparatuses when said communication apparatus is calling said other communication apparatuses for communication with said other communication apparatuses; and (g) selecting an informing mode in accordance with said tempo signal generated by said step (d) and controlling said information device to inform the user of said tempo in the selected informing mode.

15. A storage medium according to claim 14, wherein during said step (f), at least one of said tempo signal and said control signal is transmitted to said other communication apparatuses.

16. A machine-readable storage medium recording instructions for causing a machine to execute a method of controlling a communication apparatus, said method comprising the steps of:

(a) inputting speech through a speech input device;

(b) generating musical tone signals;

(c) causing said communication apparatus to communicate with other communication apparatuses in accordance with setting operations performed through an operation device that allows a user to perform said setting operations;

(d) converting speech signals transmitted from said other communication apparatuses into speech to generate the speech, and converting said musical tone signals generated by said step (b) into musical tones to generate the musical tones;

(e) inputting a playing sound produced by a musical instrument through said speech input device and analyzing a frequency of the input playing sound produced by said musical instrument; and (f) displaying information relating to a pitch of said playing sound based on the analyzed frequency, according to a desired display mode selected by the user through a selecting device that allows the user to select said desired display mode from a plurality of display modes in which said information relating to the pitch of said playing sound is displayed in different manners.

17. A machine-readable storage medium recording instructions for causing a machine to execute a method of controlling a communication apparatus capable of communicating with other communication apparatuses, said method comprising the steps of:

(a) generating musical tone signals;

(b) converting said musical tone signals generated by said step (a) into musical tones and generating the musical tones; and (c) controlling said communication apparatus such that a musical tone signal having a pitch designated by a user through an operation device that instructs generation of said musical tones in accordance with operations performed by the user is generated by said step (a), whereby a musical tone having said pitch is generated by said step (b), during communication of said communication apparatus with said other communication apparatuses.

18. A storage medium according to claim 17, wherein said method further comprises the step of transmitting information indicative of said pitch designated by the user through said operation device to said other communication apparatuses during communication of said communication apparatus with said other communication apparatuses.

* * * * *

UNITED STATES PATENT AND TRADEMARK OFFICE
CERTIFICATE OF CORRECTION

PATENT NO. : 6,859,530 B1
DATED : February 22, 2005
INVENTOR(S) : Kosei Terada et al.

It is certified that error appears in the above-identified patent and that said Letters Patent is hereby corrected as shown below:

<u>Title page, Item [54] and Column 1, Line 1,</u>
Title, should read -- COMMUNICATION APPARATUS, CONTROL METHOD THEREFOR AND STORAGE MEDIUM STORING PROGRAM FOR EXECUTING THE METHOD --.

Signed and Sealed this

Ninth Day of May, 2006

JON W. DUDAS
*Director of the United States Patent and Trademark Office*